United States Patent [19]

Standlick

[11] 4,030,860
[45] June 21, 1977

[54] VARIABLE PROPORTIONAL METERING APPARATUS

[76] Inventor: Ronald E. Standlick, 4506 Sudbury St., Warren, Mich. 48092

[22] Filed: Mar. 15, 1976

[21] Appl. No.: 666,747

[52] U.S. Cl. .................................. 417/63; 417/343; 417/349; 417/429; 417/507
[51] Int. Cl.² .................. F04B 35/00; F04B 23/06; F04B 7/02; F04B 21/02
[58] Field of Search ............ 417/63, 343, 429, 507, 417/349

[56] References Cited

UNITED STATES PATENTS

| | | | |
|---|---|---|---|
| 1,178,686 | 4/1916 | Strasburger | 417/63 |
| 2,752,989 | 7/1956 | Jenkins, Jr. | 417/429 |
| 3,672,389 | 6/1972 | McConnell et al. | 417/429 |

FOREIGN PATENTS OR APPLICATIONS

| | | | |
|---|---|---|---|
| 208,005 | 6/1956 | Australia | 417/507 |
| 2,312,647 | 9/1974 | Germany | 417/429 |

Primary Examiner—John J. Vrablik
Attorney, Agent, or Firm—William T. Sevald

[57] ABSTRACT

A fluid metering apparatus having paired cylinders, pistons and piston rods. The piston rods are connected to a lever or walking beam which, when pivoted at its center equidistant between the rod connections provides controlled equal travel distance and rate for the pistons providing equal cubic displacement in the cylinders. When the beam is pivoted off-center closer to one rod connection than to the other, the piston on the closer rod travels a shorter distance at a slower rate than the other piston providing unequal cubic displacement in the cylinders. In either case the quantities are measured proportionally to one another in the same period of time. The system is controlled by air cylinders and valves actuated by the reference piston rod. Telltale indicators are carried by the air cylinders to visually show any malfunction at each air cylinder individually. Automatic system operation is provided for continuous metering. Automatic system shut-down closes all valves at the material inlets and outlets sealing the resin, hardener, etc. in stable condition for resumption of metering.

3 Claims, 3 Drawing Figures

VARIABLE PROPORTIONAL METERING APPARATUS

BACKGROUND OF THE INVENTION

Various products are furnished to the user or applicator in two parts which are to be mixed together in specified proportions prior to use. This is particularly true in the case of epoxy resins and adhesives which are furnished in a resin portion and a hardener portion, for example. In this case, the specified porportioned quantities of each are mixed together and they "set-up" or cure in a given period of time called the "pot-life" of the mixture. In other words, once the resin and hardener are mixed together, the user has an elapsing time period in which to use the mix before it sets up or cures. Unused material in the pot after the expiration of the pot-life period becomes unusable. While a small volume user can mix a pint of hardener with a quart of resin and do a one-time job before the pot-life period expires, the industrial user who continually uses such material cannot be constantly mixing small quantities to maintain his supply within the pot-life period. Also, the industrial user cannot mix 55 gallons of resin and 30 gallons of hardener to have a day's supply when he is not using an 85 gallon quantity within the pot-life period. A man applying epoxy on a production line needs a constant fresh supply in order to apply the material as desired.

The various proportional metering devices of the prior art have built in invariable proportional supply and thus the mix can't be changed without changing the apparatus structurally as is sometimes desirable with faster or slower production rates, various batches of material, and/or material which have different reaction time periods. Also the devices of the prior art, upon a malfunction or a stoppage in various supply lines, have no means of indicating to the user where the trouble has occurred. This involves shutting down the operation and exploring the entire metering device to find and correct the trouble. Also, the prior art apparatus does not have the means to seal off the system during periods of shut-down which is desirable to provide ready-to-go set up.

SUMMARY OF THE PRESENT INVENTION

A pair of cylinders lie relative to one another and each has a piston and an extending piston rod. A lever or walking beam is connected to the piston rods of both cylinders at either end of the beam. The beam is pivoted at or adjacent to its center. When the beam is pivoted on center, the stroke of each piston rod is the same as the other. When the beam is pivoted off-center, the stroke of the piston on the short end of the beam is less than the other piston. Thus the capacity per stroke of the pistons can be varied relative to one another as desired by the selection of the location of the pivot point of the beam. The pistons and cylinders constitute the means for metering the desired measured quantities of two materials in proportion to one another such as resin and hardener which are used as examples. The apparatus is suited to handle many other materials such as liquids, pastes, etc.

One cylinder is considered the reference and/or control cylinder and the piston in the reference cylinder makes a full stroke regardless of the position of the pivot point of the beam. The other cylinder is considered the variable and/or controlled cylinder and the piston in this cylinder may make a full stroke with beams pivoted on center and less than a full stroke with the beam pivoted off-center with its short leg at the variable cylinder. The pistons of both cylinders are moved in their stroke by the force of the pressure imposed on the resin and hardener which are fed to the pistons under pressure by pumps, not shown.

Each cylinder has two valves on each end. The four valves on each cylinder are cross-paired with an inlet valve on one side of the piston operating with an outlet valve on the other side of the piston. The pairs are alternatively operated in the opposite condition (i.e.) when one pair is open, the other pair is closed.

The resin is supplied under pressure to the inlet valves of the reference cylinder and the hardener is supplied under pressure to the inlet valves of the controlled cylinder.

The outlet valves of the reference cylinder empty into a common duct and the outlet valves of the controlled cylinder into a common duct. The common outlet ducts from each cylinder are joined at and empty into a single mixing manifold. A hose leads from the mixing manifold to a manually operated valve and nozzle. The metered and mixed material emits from the nozzle.

One way check valves are located in both ducts at the mixing manifold to prevent hardener getting in the resin duct and resin getting into the hardener duct. Pressure gauges are connected on both ducts ahead of the check valves so that the operator can read the ambient pressure of each side as a key to any malfunction on one side or the other.

All the valves are opened and closed by air cylinders as shown. They may be actuated by solenoids or relays if desired. In the control system shown to illustrate the invention, two air pressure manifolds supply air to the opposite sides of each air pressure cylinder on each metering cylinder. The paired inlet and outlet valves at each metering cylinder are thus opened and closed by air pressure and held in their actuated position by air pressure.

Air pressure is supplied to each manifold by valves which actuate between a position introducing pressure to the manifolds and a position venting the manifolds to atmosphere. The two-way valves are oppositely actuated: (i.e.) when one is introducing air pressure into its respective air manifold, the other is venting its respective air manifold to atmosphere. Since the air manifolds are connected to opposite sides of each air piston, one side of each air piston is vented to atmosphere and the other side is supplied with air pressure at all times.

The piston rod of reference cylinder carries a boss which reciprocates with the stroke of the piston. A cam or switch is located relative to the position of the boss at each end of the reference piston rod stroke. The boss thus contacts a cam or switch at each end of its reciprocated stroke. The cam or switch controls and/or actuates the valves. Thus, at one end of the stroke one valve will supply air pressure and the other one will vent. At the other end of the stroke the reverse obtains.

An air piston position indicator is carried by each air cylinder. The indicator has a plunger which is spring pressed toward the air piston. Thus when the valve is closed by inward movement of the air piston, the indicator lies inwardly; and when the valve is open by outward movement of the air piston, the indicator lies outwardly. Thus the user can determine by observation that the valves are opening and closing properly or improperly.

The metering system can be operated by mechanical, electrical and/or pneumatic controls. Pneumatic controls are shown and described to illustrate automatic operation and automatic seal-off by closing the valve at shut-down. The specific details of the control are set forth in the detailed description following the description of the drawings.

DETAILED DESCRIPTION OF THE ILLUSTRATED EMBODIMENTS

Figure 1:
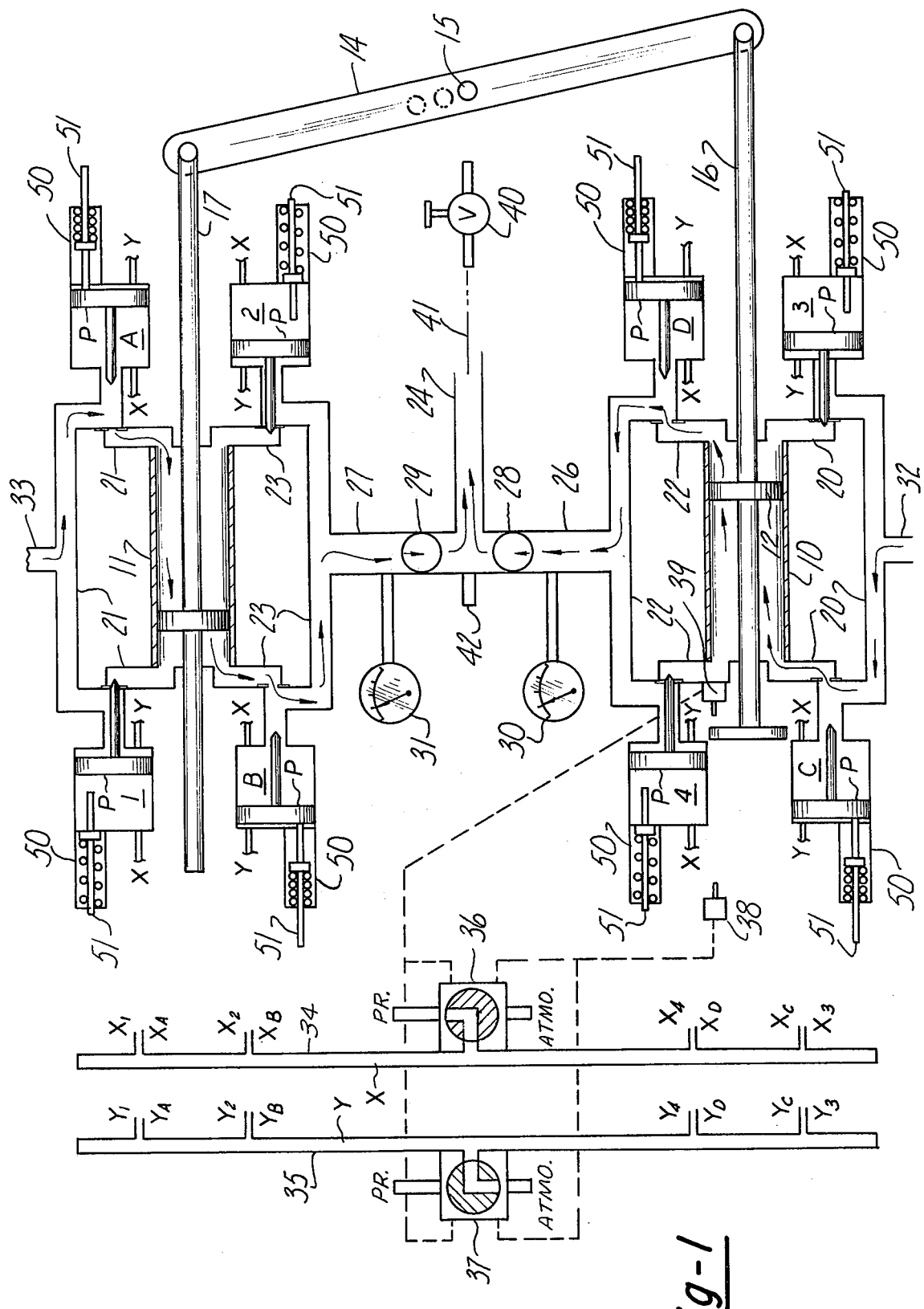
FIG. 1 is a diagrammatic showing of the variable proportional metering apparatus of the invention with the connection between the cam or switch and the two-way valves at the air manifolds indicated in broken lines; illustrating one condition of the apparatus with the reference metering piston moving to the right and the controlled metering piston moving to the left with one two-way valve venting one air manifold to atmosphere and the other two-way valve supplying air pressure to the other air manifold to locate the air cylinder operated needle valves in proper position.

Referring now to the drawings where like reference numerals and letters refer to like and corresponding parts throughout the several views, the apparatus disclosed therein to illustrate a preferred embodiment of the invention comprises a reference metering cylinder 10 and a controlled metering cylinder 11. A piston 12 lies in cylinder 10 and a piston 13 lies in cylinder 11. A lever or beam 14 is pivotally mounted at 15 adjacent the cylinders 10 and 11. A piston rod 16 connects the piston 12 to one end of the beam 14 and a piston rod 17 connects the piston 13 to the other end of beam 14.

A resin transfer duct 20 supplies resin under pressure to both ends of the reference cylinder 10. A hardener transfer duct 21 supplies hardener under pressure to both ends of the controlled cylinder 11. A resin outlet duct 22 is connected to both ends of the reference cylinder 10 and a hardener outlet duct 23 is connected to both ends of the controlled cylinder 11. A mixing manifold 24 lies between the outlet ducts 22 and 23. A conduit 26 extends from the duct 22 and conduit 27 extends from the duct 23. The conduits 26 and 27 interconnect with each other and with the mixing manifold 24. A one-way check valve 28 lies in the conduit 26 and a one-way check valve 29 lies in the conduit 27. A pressure gauge 30 communicates with conduit 26 and a pressure gauge 31 communicates with conduit 27. A pipe 32 connects to the duct 20 to supply resin under pressure and a pipe 33 connects to the duct 21 to supply hardener under pressure.

The pistons P of the air cylinders 1 to 4 and A to D position their respective needle valves V. Air cylinders in group 1, 2, 3 and 4 and air cylinders in group A, B, C and D are mounted on the resin ducts 20 and 22 and on the hardener ducts 21 and 23. Each said air cylinder has a piston P and a needle valve V. The needle valves V allow flow in the ducts when retracted from the ducts and block flow in the ducts when extended into the ducts.

Each piston P is moved to extend or retract its associated valve V by being vented on one side and supplied with air pressure on the other side. Each cylinder A to D and 1 to 4 has a tube X connected on one side of the piston P and a tube Y connected on the other side of piston P, FIGS. 1 and 2.

An air manifold 34 has tube connections X1–X4 and XA–XD connected to each air cylinder A–D and 1–4 with half the connections on the inside of the air cylinders and the other half of the connections on the outside of the air cylinders. Thus when air pressure is supplied by the manifold 34, one half of the air cylinders A–D and 1–4 will be powered to open their respective needle valves V and the other half will be urged to close their respective needle valves V.

An air manifold 35 has tube connections Y1–Y4 and YA–Yd connected to each air cylinder A–D and 1–4 with half the connections on the inside (where the X connectons are on the outside) and the other half of the connections on the outside of the air cylinders (where the X connections are on the inside). Thus when air pressure is supplied by the manifold 35, one half of the air cylinders A–D and 1–4 will be powered to open their respective needle valves V and the other half will be urged to close their respective needle valves V, FIGS. 1 and 2.

A valve 36 controls air manifold 34 and a valve 37 controls air manifold 35. A boss 25 is carried by piston rod 16. A cam or switch 38 is mounted on one side of the boss 25 and a like cam or switch 39 is mounted on the other side of the boss 25. The cams 38 and 39 are spaced apart a distance so that the boss 25 contacts and operates the cam 38 at one end of the stroke of the reference piston rod 16 in one direction of reciprocation and so that the boss 25 contacts and operates the cam 39 at the end of the stroke of the piston rod 16 in the other direction of reciprocation.

The valves 36 and 37 are oppositely oriented relative to their respective manifolds 34 and 35 so that when one is supplying air under pressure, the other is venting to atmosphere. The valves 36 and 37 thus oscillate between connecting their respective manifolds to air pressure and to atmosphere. The switches or cams 38 and 39 control and actuate the oscillation of the valves 36 and 37. The condition of the valves 36 and 37 as seen in FIG. 1 was effected by cam 38 at the end of the previous half stroke of the piston rod 16. When the piston rod 16 completes its present half stroke as indicated, its boss 25 will activate cam 39 and the valves 36 and 37 will be activated to the condition seen in FIG. 2.

Figure 2:
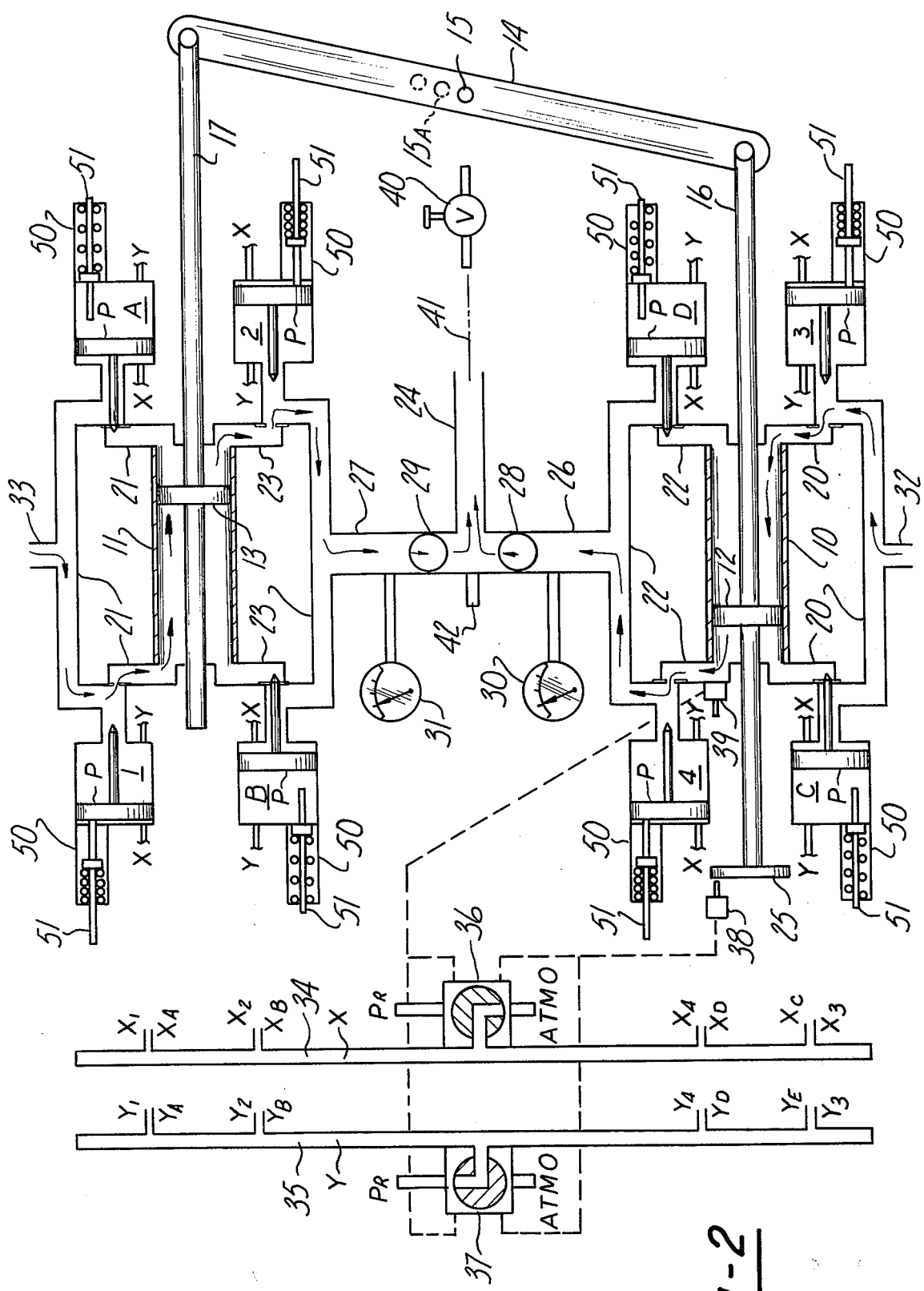
FIG. 2 is a view similar to FIG. 1 illustrating the other condition of the apparatus with the reference metering piston moving to the left and the controlled piston moving to the right; with the two-way valves reversed relative to FIG. 1, and all the air operated needle valves at the reference and controlled cylinders reversed relative to FIG. 1.

A housing 50 is mounted on each air cylinder 1–4 and A–D, FIGS. 1 and 2. An indicator pin 51, FIG. 1, is axially slideably disposed in the housing 50 sealably extends into the air cylinders 1–4 and A–D at one end and extends outwardly of the housing 50 at the other end. Each pin 51 has a collar 52 internally of the housing 50. A spring 53 bears on the collar 52 and resiliently displaceably urges the pin 51 in a direction inwardly of the air cylinders 1–4 and A–D. Thus when the air pistons P have moved their respective needle valves V to block the ducts 20, 21, 22 and 23 the indicator pins 51 do not extend outwardly of the housing 50; this indicates that the valves V are closed. Thus when the air pistons P have retracted their respective valves V to open the ducts 20, 21, 22 and 23, the indicator pins 51 extend outwardly of the housings 50; this indicates the valves are open. In the event of any malfunction, the user is advised which valve has not operated at the exact point of the malfunction.

Figure 3:
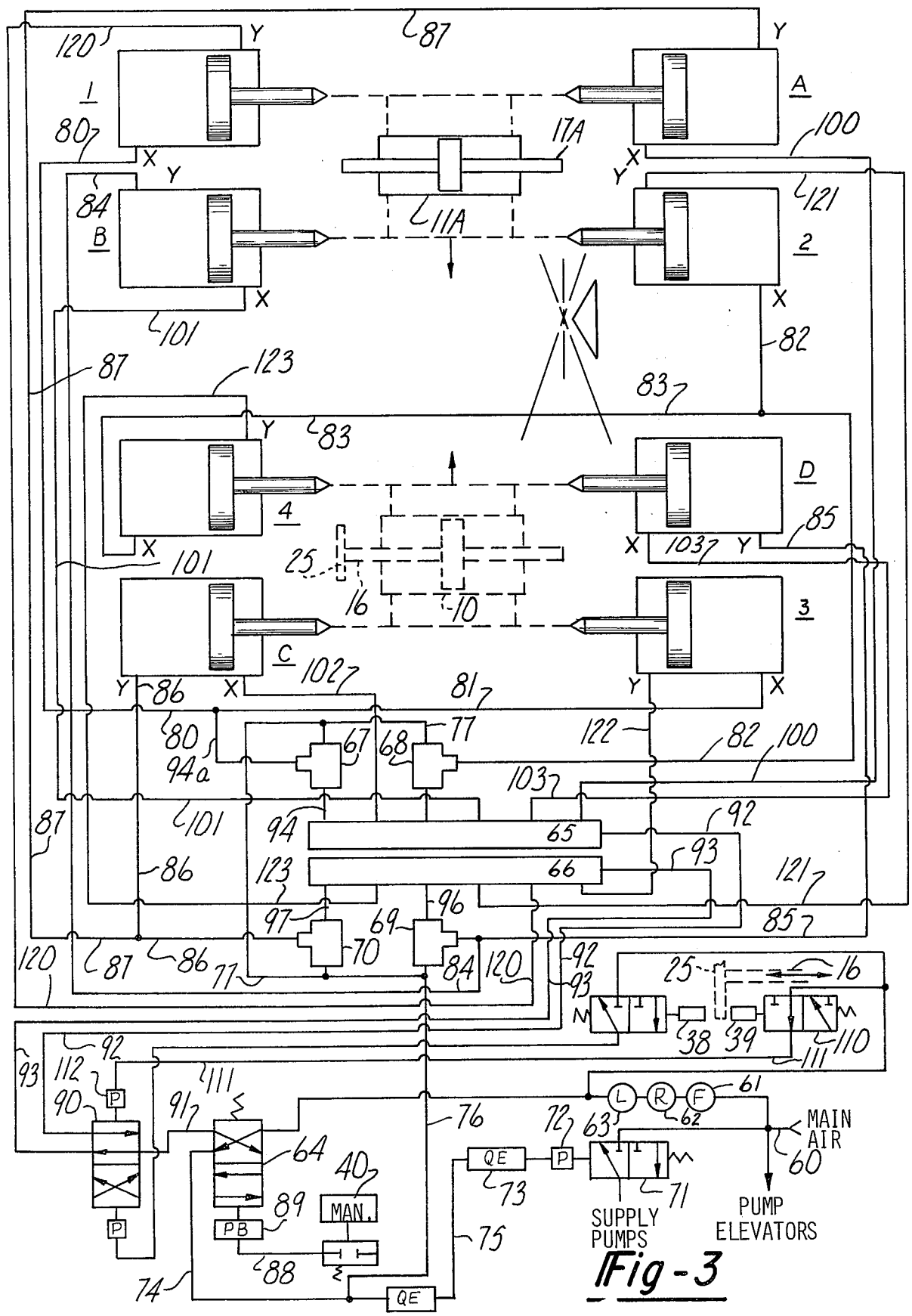
FIG. 3 is a view similar to FIGS. 1 and 2, diagrammatically illustrating the control system which automatically operates the metering system during metering use and which shuts down the metering system with all valves closed to seal off the metering system in a state of readiness to again resume metering operation and showing a controlled cylinder and piston of smaller diameter than the reference cylinder and piston.

Referring to FIG. 3, air-pressure is supplied by main air line 60, through filter 61, regulator 62, lubricator 63, and four-way valve 64 to the air cylinders 1-2-3-4 and A-B-C-D in two different ways. One way is alternately through one or the other of air manifolds 65 and 66. The alternating manifold 65 and 66 way is the normal operational action of the apparatus while metering out measured proportional quantities of materials. The other way is through shuttle valves 67, 68, 69 and 70. The shuttle valves 67 to 70 way is for stopping metering and closing all the air cylinder operated valves 1–4 and A–D for the purpose of shutting down the apparatus with the materials under pressure in the system, so that upon reactivation, the apparatus is capable of immediately operating to accurately meter out the materials. Also, shutting down the apparatus while under pressure with all air cylinder operated valves close, the material cannot bleed into one another, create a void in the line, and/or lose their character.

The main air line 60 also furnishes pressure to the remote pumping units which force the material to the metering cylinders 10 and 11. A four-way valve 71 on line 60 controls pressure to the remote pumps. The valve 71 is actuated by a pilot valve 72 and a quick exhaust valve 73 as later described.

Four-way valve 64 controls the system between shut-down and use conditions. The manual use valve 40, in turn, controls four-way valve 64. When no material is being used, the manual valve 40 is closed and four-way valve 64 supplies air pressure through lines 74 and 75 to valves 71, 72 and 73 and the pumps stop. Air pressure is also supplied through lines 76 and 77 to all shuttle valves 67 to 70 and they close their ports leading to the manifolds 65 and 66 and pressure is supplied by the shuttle valves 67 to 70 to the air cylinders A to D and 1 to 4 to close their valves V. Shuttle valve 67 closes the valves V at air cylinders 1 and 3 via line 80 to cylinder 1 and line 81 to cylinder 3. Shuttle valve 68 closes the valves V at air cylinders 2 and 4 via line 82 to cylinder 2 and line 83 to cylinder 4. Shuttle valve 69 closes the valves V air air cylinders B and D via line 84 to cylinder B and line 85 to cylinder D. Shuttle valve 70 closes the valves V at air cylinders A and C via line 86 to cylinder C and line 87 to cylinder A. Thus all the valves V at all air cylinders 1 to 4 and A to D are closed sealing off the resin and hardener material in their portion of the system.

Referring now to the operation of system during use, upon the manual valve 40 opening on line 88, pressure bleed valve 89 releases pressure on four-way valve 64 and it switches condition from "shut-down" to "operation" and supplies air to four-way valve 90 via line 91 instead of to the shuttle valves 67–70 via line 74.

Four-way valve 90 supplies pressure to either air-manifold 65 via line 92 or to air-manifold 66 via line 93. Upon air-pressure being supplied to the manifolds 65 and/or 66, the pressure on the shuttle valves 67 to 70 is reversed via lines 94, 95, 96 and 97 and they change condition blocking the ports leading back via lines 75, 76 and 77, whereupon the pressure in line 75 is quick exhausted by valves 73 and four-way valve 71 activates the material supply pumps to force material to the metering cylinders 10 and 11.

During metering operation, the material flow control valves V on air cylinders 1 to 4 and A to D are dependent for their open and closed positions on the two air manifolds 65 and 66. Assuming that manifold 65 is supplied with pressure via line 92 by valve 90, air cylinders 1, 2, 3 and 4 close their valves V as follows: air cylinders 1 and 3 via line 94, shuttle valve 67, line 94A, and lines 80 and 81; air cylinders 2 and 4 via lines 95, 82 and 83. Under these circumstances reference piston rod 16 is traveling to the right and controlled piston rod 17 is moving to the left under the pressure of the resin and hardener materials being pumped to them via the open valves V at air cylinders A, B, C, D as follows: pressure at manifold 65 flows to air cylinder A via line 100; to air cylinder B via line 101; to air cylinder C via line 102; and air cylinder D via lie 103. Under these valve conditions the flow of hardener and resin materials in the system is as shown in FIG. 1 by the flow-arrows.

When reference piston rod 16 reaches the end of its right stroke its boss 25 engages cam 39 and this engagement activates cam valve 110 changing its influence on line 11 to plunger 112 on four-way valve 90 and the latter changes condition switching air pressure from air manifold 65 and supplying air pressure to air manifold 66 whereupon all the air cylinder valves V change condition and supply resin and hardener material under pressure at the other end of the metering cylinders 10 and 11 and reference piston rod 16 moves to the left and controlled piston rod 17 moves to the right.

With pressure supplied to air manifold 66, air cylinders 1, 2, 3 and 4 open their valves V as follows: air cylinder 1 via line 120; air cylinder 2 via line 121; air cylinder 3 via line 122; and air cylinder 4 via line 123. Also air cylinders A, B, C and D close their valves V as follows: air cylinders A and C via line 97, shuttle valve 70, line 86 and line 87; air cylinders B and D via line 96, shuttle valve 69, line 84 and line 85. Under these valve conditions the flow of resin and hardener materials in the system is as shown in FIG. 2 by the flow-arrows.

SET-UP

Resin supply under pressure in connected to pipe 32, hardener under pressure is connected to pipe 33, and air under pressure is connected to the control system. A use nozzle 40 and hose 41 are connected to the mixing manifold 24. The operator opens the valve on the nozzle 40 and the resin flows into the duct 20 and into the reference cylinder 10 as indicated at the bottom in FIGS. 1 and 2 and a hardener flows into the duct 21 and controlled cylinder 11 as indicated at the top in FIGS. 1 and 2. The system is filled in the same manner as it operates in use which is now described.

USE AND OPERATION

When the user opens the valve on the nozzle 40, FIG. 1, with resin under pressure being supplied by pipe 32 to duct 20, air cylinder 3 has closed its valve V and air cylinder C has opened its valve V and resin flows into the reference cylinder 10 and forces the piston 12 to the right. Air cylinder 4 has its valve V closed blocking exit of resin behind the motion of the piston 12 and air cylinder D has its valve open ahead of the motion of the piston 12 and resin flows into the exit duct 22, into conduit 26, past the check valve 28 and into the mixing manifold 24. At the same time, with hardener under pressure being supplied by pipe 33 to duct 21, air cylinder 1 has closed its valve V and air cylinder A has opened its valve V and hardener flows into the controlled cylinder 11 and forces the piston 13 to the left. Air cylinder valve 2 has its valve V closed blocking exit of resin behind the motion of the piston 13 and air cylinder B has its valve V open ahead of the motion of the piston 13 and hardener flows into exit duct 23, into conduit 27, past the check valve 29 and into the mixing manifold 24. This condition of the air cylinders 1–4 and A–D and their valves is effected by venting the air cylinders to atmosphere on one side and supplying air pressure on the other side of the air cylinders 1–4 and A–D.

It is to be particularly noted that the pistons 12 and 13 move the same distance at the same rate due to the fact that their piston rods 16 and 17 are connected to opposite ends of the beam 14 which is pivoted at a point 15 mid-way between the piston rods 16 and 17. Thus the pistons in their movement supply equal quantities of resin and hardener at the same rate to the mixing manifold 24 with equal diameter cylinders 10 and 11.

One cylinder 10, 11, may be smaller in diameter than the other, so that unequal quantities are metered with equal strokes of the pistons. It is within the scope of the invention to provide apparatus with cylinders of different diameters and/or to sleeve the cylinders. FIG. 3 shows a controlled cylinder 11A and a piston on the rod 17A of smaller diameter than the reference cylinder 10 and the piston on the rod 16, for example.

Upon the piston 12 reaching the end of its stroke as seen in FIG. 1, the boss 25 contacts and operates the cam 39 which changes the condition of the valve 36 from pressure supply to venting to atmosphere and changes the condition of the valve 37 from venting to atmosphere to pressure supply. This reverses the conditions of the air cylinders so that air cylinders A, B, C, D move from their open valve V position of FIG. 1 to their closed valve V position of FIG. 2 and air cylinders 1, 2, 3, 4 move from their closed valve V position of FIG. 1 to their open valve V position of FIG. 2. This supplies resin and hardener under pressure into the cylinders 10 and 11 against the pistons 12 and 13 forcing piston 12 to move to the left and piston 13 to move to the right as seen in FIG. 2. When the reference piston 12 gets to the end of its left stroke, FIG. 2, it contacts and operates cam 38 which actuates control valves 36 and 37 to change their conditions from that seen in FIG. 2 to that seen in FIG. 1 and the system then operates as per FIG. 1 as previously described.

To vary the engineered proportions of resin and hardener in the apparatus without changing cylinder size, the pivot pin 15 is removed and a pivot pin 15A is inserted in the beam 14, FIG. 2. With the beam pivoted at 15A, the reference piston 12 still makes its full reciprocating stroke so that the boss 25 still contacts the cams 38 and 39 and the valves 36 and 37 are still reversed as previously described. Thus the same quantity of resin is delivered as previously described. A lesser quantity of hardener is delivered because the piston rod 17 is controlled by the short leg of the beam 14 above the pivot point 15A and the piston 13 moves a shorter distance and at a slower rate than the resin piston 12. Thus a proportionally smaller quantity of hardener is supplied to the mixing manifold where it is fixed with the proportionally larger quantity of resin. However, the smaller hardener and larger resin quantities are supplied to the mixing manifold 24 at their different rates over the same period of time so that the proportion of resin and hardener delivered at the mixing manifold is uniform at all times giving an accurate proportional mixture as the beam 14 controls the motion of both pistons 12 and 13 at a measured proportional rate and distance.

Should a malfunction occur and the feed at the nozzle be uneven, the user has only to look at the gauges 30 and 31 and the indicator pins 51 at the air cylinders to ascertain where the trouble is.

The apparatus may be shut down by closing all the valves V at air cylinders 1 to 4 and A to D, FIG. 3, so that the materials being metered are held under pressure in the various components of the apparatus except where they are mixed together in the mixing manifold and downstream therefrom. The mixing manifold 24 and parts downstream are then flushed with solvent. A fitting 42 on the conduits 26 and 27 opposite the mixing manifold 24 is provided. The solvent is forced through the fitting 42, the mixing manifold 24, hose 41 and nozzle 40 to clear them of material which will cure to a solid mass. The one-way check valves 28 and 29 in the conduits 26 and 27 prevent solvent from getting into the resin or hardener in the ducts 22 and 23. Thus the apparatus may be shut down without emptying any material except as previously described.

In engineering the apparatus for a particular job with certain materials, the cylinders 10 and 11 may be of different diameters to provide an established difference in the proportional quantities of hardener and resin. Also a cylinder may be sleeved and a smaller piston used to vary the proportions. In any event, the established proportions may be easily varied by changing the pivot points 15 and 15A as desired to move the controlled piston the desired distance relative to the reference piston to obtain the desired relative cubic capacity of the cylinders.

While resin and hardener have been used to describe the mixture attained, it will be understood that any two substances or mixtures can be metered by the apparatus. Also the apparatus can run without nozzle 40 control, as it can deliver the mixture to containers for storage and shipment, such as where the mixture is paint, paste, etc., which does not cure in the container. Also, the needle valves V and the control valves may be operated by electrical solenoids and relays if desired. Also, a number of cylinders and pistons may be connected to the beam and three or four fluids mixed in accurate proportional quantities.

While only examplary embodiments have been shown and described, it will be understood that the invention is limited only by the scope of the appended claims.

I claim:
1. An apparatus for metering proportional quantities of two fluids to obtain a desired mixture of the fluids, comprising,
   a reference cylinder having opposite ends, a piston, and a piston rod,
   a controlled cylinder having opposite ends, a piston, and a piston rod, a beam having opposite ends, a pin pivotally mounting said beam intermediate its said ends, means pivotally connected said piston rods to said opposite ends of said beam whereby the travel directions of said pistons in said cylinder is controlled proportional to one another with said pistons moving in opposite directions;

said beam controlling proportional travel of said pistons to provide metering of proportional quantities of said fluids, a bi-directionally powered inlet valve on each end of each said cylinder; a bi-directionally powered outlet valve on each end of each said cylinder;

supply ducts for furnishing one fluid under pressure to both said inlet valves on said reference cylinder; supply ducts for furnishing another fluid under pressure to both said inlet valves on said controlled cylinder;

outlet ducts receiving the one fluid from said outlet valves on said reference cylinder; outlet ducts for receiving the other fluid at said outlet valves at said controlled cylinder; and means receiving the fluids from said outlet ducts for mixing the fluids together, each said inlet valve on one end of each said cylinder being cross-paired with one said outlet valve on the opposite end of each said cylinder;

power means for operating said valves between open and closed positions; and control means for closing one cross-pair of said valves and opening said other cross-pair of said valves on both said cylinders in one direction of opposite travel of said pistons so that fluids under pressure introduced at one said end of each said cylinder cause said pistons to move and to force the fluids out said other end of said cylinders;

said control means reversing the condition of said valves in the opposite direction of travel of said pistons from open-to-closed and from closed-to-open so that the fluids under pressure are introduced at the opposite ends of said cylinders causing said pistons to move in the opposite direction of travel to force fluids out the opposite ends of said cylinders.

2. In an apparatus as set forth in claim 1, said operating means for opening and closing said valves having a moving member which actuates said valves; and telltale means mounted on said operating means comprising a housing, an indicator pin, and a spring bearing on said pin to displaceably locate said pin; said pin being moveable in one direction by said moving member to extend said pin from said housing to visually indicate one position of said valve operated by said moving member and movable in the other direction by said spring to retract said pin into said housing to visually indicate the other condition of said valve operated by said moving member.

3. In apparatus as set forth in claim 1, a first air pressure manifold, a first manifold valve on said first manifold, means for connecting a source of air pressure to said first manifold valve, and a vent in said first manifold valve to atmosphere;

a second air pressure manifold, a second manifold valve on said second manifold, means for connecting a source of air pressure to said second manifold valve, and a vent in said second manifold valve to atmosphere;

said first manifold being connected to said control valves on both said proportioning cylinders to actuate said control valves on the stroke of both said pistons in said proportioning cylinders in one direction to open the supply valves behind said pistons, to open the discharge valves ahead of said pistons, to close the supply valves ahead of said pistons, and to close the discharge valves behind said pistons in one direction of opposite travel of said pistons, said second manifold being connected to said control valves on said proportioning cylinders to actuate said control valves in the opposite direction on the reverse direction of opposite travel of said pistons, a boss on said piston rod of said reference cylinder, first cam means at said reference cylinder contactable by said boss at the end of the stroke of said reference piston in one direction to actuate said cam means, second cam means remote from said reference cylinder contactable by said boss at the end of the stroke of said reference piston in the opposite direction to actuate said cam means, connecting means between both said cam means and said manifold valves to actuate said manifold valves between a first position feeding air pressure to one said manifold and venting said other manifold to atmosphere and a second position feeding air pressure to said other manifold and venting said one manifold to atmosphere in synchronization with the travel directions of said pistons in said proportioning cylinders.

* * * * *